United States Patent [19]

Yanagisawa

[11] 4,307,156
[45] Dec. 22, 1981

[54] MAGNETIC RECORD MEMBER

[75] Inventor: Masahiro Yanagisawa, Tokyo, Japan

[73] Assignee: Nippon Electric Co., Ltd., Tokyo, Japan

[21] Appl. No.: 47,916

[22] Filed: Jun. 12, 1979

[30] Foreign Application Priority Data

Jun. 13, 1978 [JP] Japan .................. 53-71915
Aug. 8, 1978 [JP] Japan .................. 53-97065
Aug. 8, 1978 [JP] Japan .................. 53-97066

[51] Int. Cl.³ .......................... G11B 5/76; G11B 5/82
[52] U.S. Cl. .................................. 428/623; 360/135; 360/136; 427/131; 427/132; 428/64; 428/65; 428/447; 428/469; 428/632; 428/633; 428/621; 428/900; 428/928; 428/688; 428/694; 428/693
[58] Field of Search .................. 428/900, 64, 65, 928, 428/447, 611, 633, 333, 621, 623, 622, 624, 626, 632, 538, 539, 469; 427/131, 132; 360/135, 134

[56] References Cited

U.S. PATENT DOCUMENTS

| | | | |
|---|---|---|---|
| 4,069,360 | 1/1978 | Yanagisawa et al. | 428/928 |
| 4,079,169 | 3/1978 | Wogh et al. | 428/928 |
| 4,118,540 | 10/1978 | Amont et al. | 428/447 |
| 4,124,736 | 11/1978 | Patel et al. | 428/928 |
| 4,152,487 | 5/1979 | Yanagisawa et al. | 428/928 |
| 4,154,875 | 5/1979 | Yanagisawa et al. | 427/131 |
| 4,162,350 | 7/1979 | Yanagisawa et al. | 428/928 |
| 4,206,256 | 6/1980 | Matthies et al. | 428/447 |
| 4,224,381 | 9/1980 | Patel et al. | 428/900 |

FOREIGN PATENT DOCUMENTS

| | | | |
|---|---|---|---|
| 2629411 | 1/1977 | Fed. Rep. of Germany | 428/900 |
| 2648303 | 5/1977 | Fed. Rep. of Germany | 427/131 |
| 1522505 | 8/1978 | United Kingdom | 427/132 |

*Primary Examiner*—Stanley S. Silverman
*Attorney, Agent, or Firm*—Fitzpatrick, Cella, Harper & Scinto

[57] ABSTRACT

An improved magnetic record member having a non-magnetic disk base with a mirrored surface, a magnetic-metal thin-film medium formed on the disk base; an intermediate layer composed of an oxide of a magnetic metal, a chromium oxide, or a phosphate formed on the film medium; and a layer of polysilicate or a metal alcoxide hydrolysis polymer formed on the intermediate layer.

28 Claims, 3 Drawing Figures

MAGNETIC RECORD MEMBER

BACKGROUND OF THE INVENTION

1. Field of the Invention

This invention relates to a magnetic record member for use in magnetic recording devices, such as a magnetic disk or a magnetic drum.

2. Description of the Prior Art

Generally, recording and reproducing systems employed in magnetic recording devices equipped with a recording/reproducing head (hereinafter referred to as a head) and a magnetic record member may be classified into the following two systems. The first is known as a contact-start-stop (CSS) system which is operated by setting a head in contact with the surface of a magnetic record member at the start of operation, subsequently rotating the record member at a predetermined speed in such a manner as to form an air-film space between the head and the record member surface, and performing a recording or playback action while maintaining such space. According to the CSS system, the rotating magnetic record member is stopped simultaneously with termination of the operation, and the magnetic head is maintained in frictional contact again with the record member surface as at the start of the operation.

The second type of system is operated by abruptly pressing a head onto the surface of the record member which is already rotating at a predetermined speed, to form an air-film space therebetween, and performing a recording or reproducing action while maintaining such space.

In the first system, the head and the record member surface are kept in frictional contact with each other both prior to the start and after the end of the operation while in the second system, the head is brought into contact with the record member surface only when pressed thereto during operation. The frictional force exerted between the head and the record member surface while in this state of mutual contact causes wear of both the head and the record member and may finally damage the head and a magnetic-metal thin film medium formed on the record member. Moreover, even a slight variation in the attitude of the head in such a state of frictional contact results in a nonuniform load imposed on the head and might therefore damage the head and the record member surface. Furthermore, during the recording or reproducing operation, in those cases where the head suddenly and unexpectedly contacts the surface of the magnetic record member, a large frictional force is exerted between the head and the record member which may damage both or cause a breakdown thereof.

For the purpose of protecting the head and the magnetic record member from such friction as well as from such wear and breakdown resulting from this mutual contact, it is necessary to coat the surface of the record member with a protective film. For example, a plated metallic film such as Cr, Rh or Ni-P is conventionally employed. However, this film does not effectively solve the problems associated with the above-described frictional contact.

Another protective film is proposed in U.S. Pat. No. 3,466,156 which consists of a synthetic polymer thin film on a magnetic-metal thin film medium and of a wax film coated on said polymer thin film. However, the adhesion between each of these two films and the individual underlayer thereof is insufficient, with the result being that each film is peeled off from the underlayer as a result of repeated or strong frictional contacts between the head and the magnetic record member, and eventually this arrangement is not suited for practical use either.

Moreover, still another protective film is disclosed in U.S. Pat. No. 3,719,525 which is formed by oxidizing the surface of a magnetic-metal thin film medium and applying a silicone oil thereto. This protective film is, however, disadvantageous in that the magnetic characteristics of the thin film medium are deteriorated and an undesirable adhesion phenomenon occurs between the head and the disk, hence failing to serve as an effective means to eliminate the problem of frictional contact and therefore is unpractical.

The present inventor has previously proposed a magnetic record member wherein a magnetic-metal thin film medium is coated with a film composed of a hydrolysis polymer of a polysilicate or metal alkoxide, and another magnetic record member where a layer of an oriented lubricant is further formed on such a hydrolysis polymer film (see U.S. Pat. No. 4,069,360 and copending, commonly-assigned, U.S. patent applications Ser. Nos. 844,623 and 860,832, filed Oct. 25, 1977 and Dec. 15, 1977, respectively). Although each of these two inventions is capable of protecting the magnetic record member from the above-mentioned phenomenon of frictional contact, the reliability against such phenomenon is required to be as high as possible.

SUMMARY OF THE INVENTION

Therefore, an object of the present invention is to provide an improved magnetic record member which has a greater dropout or error margin and is capable of protecting its magnetic-metal thin film medium more completely from the above-described frictional contact.

In summary, the present invention is an improved magnetic record member comprising:

a nonmagnetic disk base having a polished mirror surface, a magnetic-metal thin film medium formed on the mirror surface of the disk base, an intermediate layer which is formed either directly on the thin film medium by chemical, electrical or heat treatment thereof or on a nonmagnetic metal layer which is itself formed on the thin film medium, the intermediate layer in this case being formed by chemical, electrical or heat treatment of the nonmagnetic metal layer, and at least one layer of an inorganic polymer formed on the intermediate layer either directly or through a high adhesivity layer.

BRIEF DESCRIPTION OF THE DRAWINGS

For the purpose of illustrating the invention, several embodiments which are presently preferred are shown in the drawings, it being understood, however, that this invention is not limited to the precise arrangements and instrumentalities shown therein.

DETAILED DESCRIPTION OF THE INVENTION

Figure 1:
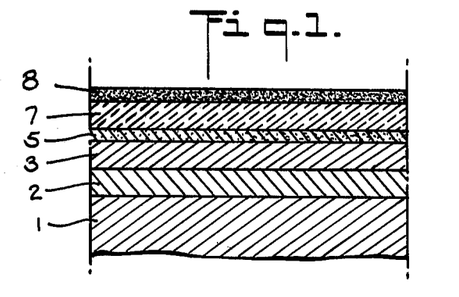
FIGS. 1 through 3 are sectional views showing the structures of magnetic record members embodying the invention.

Referring now to the drawings, wherein like numerals indicate like elements, there is shown in FIG. 1 a magnetic record member constructed in accordance with one embodiment of the invention. The record member comprises an alloy disk base 1, a nonmagnetic alloy layer 2 formed thereon, a magnetic-metal thin film medium 3 formed on the polished surface of the nonmagnetic alloy layer 2, an intermediate layer 5 formed on the medium 3, an inorganic polymer layer 7 containing (or not containing) a stress relaxation agent and formed on the layer 5, and a lubricant layer 8 formed on the polymer layer 7.

Figure 2:
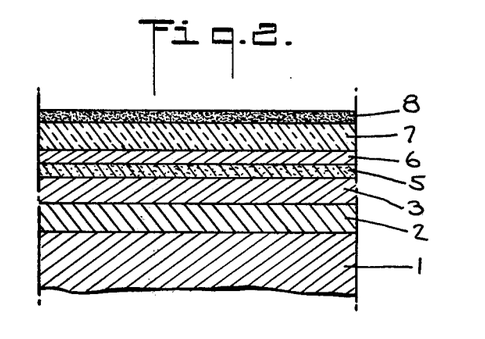

A second embodiment of this invention is shown in FIG. 2. The magnetic record member represented in FIG. 2 is constituted similarly to that of FIG. 1 and comprises a disk base 1, an alloy layer 2, a magnetic-metal thin film medium 3, an intermediate layer 5, a high adhesivity layer 6, an inorganic polymer layer 7, and a lubricant layer 8.

Figure 3:
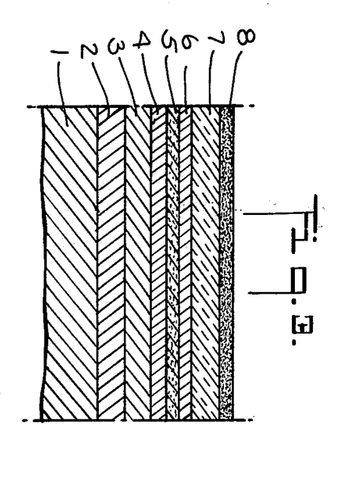

Referring to FIG. 3, a third embodiment of the invention is shown and includes a disk base 1, an alloy layer 2, a magnetic-metal thin film medium 3, a nonmagnetic metal layer 4, an intermediate layer 5, a high adhesivity layer 6, an inorganic polymer layer 7, and a lubricant layer 8.

It is necessary for the surface of the alloy disk base 1 to be finished flat within a sufficiently small undulatory tolerance not exceeding 50 microns in the circumferential direction and 100 microns in the radial direction. If it is not within these values, the head flying over the magnetic record member during a recording or reproduction operation may fail to follow the vertical motion of the record member surface and thereby cause a variation in the spacing therebetween, hence varying the recording/reproduction characteristics as a result. The nonmagnetic alloy layer 2, which may be formed by plating on the alloy disk base 1, is finished to a mirror surface whose roughness is below 0.2 micron. In the case where the alloy disk base 1 is composed of a metal polishable to such a mirror surface, the layer 2 is not required. The magnetic-metal thin film medium 3 adapted for high-density recording may be formed by plating on the layer 2.

The protective film which is capable of completely protecting the film medium 3 from contact with the head or from humidity and temperature fluctuations comprises at least the intermediate layer 5 and the inorganic polymer layer 7. In the embodiment of FIG. 3 however, a preferred protective layer is shown and consists of a nonmagnetic metal layer 4 formed on the thin film medium 3, an intermediate layer 5 formed on the metal layer 4, a high adhesivity layer 6, one or more layers of an inorganic polymer formed thereon and containing (or not containing) a stress relaxation agent, and a lubricant layer 8 formed on the film 7. These various layers may be formed by any conventional process, such as those shown in the examples below.

For the purpose of attaining a high durability against frictional contact with the head, the protective film needs to meet the following conditions: (1) high hardness; (2) small internal stress; (3) excellent adhesion to the underlayer; and (4) small coefficient of friction. In the protective film of the present invention, remarkable effects are achievable against its frictional contact with the head by virtue of the constitution thereof obtained by adhesively coating a magnetic-metal thin film medium, through the intermediate layer, with an inorganic polymer layer which has a small internal stress, a high hardness and a small coefficient of friction. It is preferable for the protective film to provide a magnetic record member of a greater so-called error or dropout margin (i.e., defined as the ratio of the difference between the maximum and minimum head outputs to the maximum head output) by maintaining the uniformity of the thickness of the protective film over the magnetic-metal thin film 3 to reduce any variation in the reproduction output of the head. The protective film obtained by interposing a nonmagnetic metal layer 4 between the magnetic-metal thin film medium 3 and the intermediate layer 5 is well suited to maintain this uniformity and thereby increase the error margin in the magnetic record member. More preferably, the adhesion can be further intensified by interposing a high adhesivity layer 6 between the intermediate layer 5 and the inorganic polymer layer 7.

It is also possible to attain a greater decrease in the internal stress of the protective film by mixing one or more kinds of stress relaxation agents into the inorganic polymer layer 7. Furthermore, the coefficient of friction is further reducible by forming a lubricant layer on the inorganic polymer layer 7 containing (or not containing) the said stress relaxation agent(s).

A preferred protective film of the magnetic record member according to the present invention has the following features:

(1) A nonmagnetic metal layer is formed on the magnetic-metal thin film medium so as to maintain uniformity in the thickness of the protective film.

(2) The adhesion of the nonmagnetic metal layer is high with respect to the magnetic-metal thin film medium on which it is formed.

(3) The nonmagnetic metal layer may be made so thin (only several percent of the protective film) as to have substantially no effect on the thickness of the entire protective film.

(4) The intermediate layer formed on the nonmagnetic metal layer adheres thereto closely with a remarkably great adhesion, or to the inorganic polymer layer containing (or not containing) a stress relaxation agent.

(5) Any nonuniformity of thickness within the nonmagnetic metal layer may be minimized since the thickness of the intermediate layer may be varied within substantially the entire allowable thickness range of the nonmagnetic metal layer.

(6) The high adhesive layer may be made so thin (several tens of angstroms) as to have substantially no effect on the thickness of the entire protective film.

(7) The high adhesive layer provides very firm and adhesive coupling between the intermediate layer and the inorganic polymer layer containing (or not containing) the stress relaxation agent. Since great improvement is achieved in the antifriction property of the protective film against contact with the head due to this enhanced adhesion, the inorganic polymer layer occupying most of the thickness of the entire protective film can be made even thinner.

It is apparent from the above discussion that the protective film of the present invention is effective for preventing any increase of the spacing between the head and the magnetic-metal thin film that may result from the multilayer structure of the protective film, and further is even capable of decreasing this spacing. That is, the record member according to the present invention is eminently advantageous for high-density recording.

A significant advantage of the present invention accrues by the interposition of a nonmagnetic metal between the magnetic-metal thin film medium and the intermediate layer, which enables one to maintain a uniform thickness of the entire protective film on the magnetic-metal thin film medium to further increase the dropout margin.

The inorganic polymer layer described above contains a hydrolysis polymer of an alkoxide or acylate of a metal or semimetal. In this context, the term "semimetal" means the same as defined in U.S. Pat. No. 4,069,360, the entire disclosure of which is hereby incorporated herein by reference. Examples of such polymers are described below; i.e., a polysilicate and a hydrolysis polymer of a meta alkoxide.

The hydrolysis polymer which forms the inorganic polymer layer may be a polysilicate which is a kind of inorganic polymer substance in which covalent Si—O bonds are linked to Si—OH . . . O bonds to form a three-dimensional network structure as shown below In this network structure, the solid lines denote covalent bonds, and the chain lines denote hydrogen bonds.

The polysilicate may be manufactured by conventional processes, for example by the dehydration condensation polymerization of tetrahydroxysilane Si-(OH)$_4$ which is a hydrolysis product of a tetraalkoxysilane or silicon acylate. Tetraalkoxysilane, which is a raw material for tetrahydroxysilane, may be represented by the chemical formula Si(OR)$_4$, and silicon acylate by Si(OCOR)$_4$, in which R is an alkyl group, preferably an alkyl group having 1 to 5 carbon atoms, such as methyl, ethyl, propyl or butyl.

It is important, and therefore preferred, that the polysilicate contain a large quantity of silanol group, Si—OH, so as to ensure a high adhesion particularly to the underlayer. That is, the silanol-containing polysilicate layer adheres closely to the intermediate layer or to the high adhesivity layer with a remarkably high adhesion to provide extremely excellent durability against frictional contact with the head. The polysilicate layer adheres to the intermediate layer or the high adhesive layer with a far greater force than a layer of an organic resin such as phenol resin or epoxy resin. This outstanding adhesivity property is attributable to the firm bonding between the silanol groups and the intermediate layer or the high adhesive layer. The preferred amount of silanol in the polysilicate is from about 10 to about 56 weight percent, based on the total weight of the polysilicate. This amount may be controlled by the proper selection of the baking temperature employed (see examples below). For example, baking temperatures of 100°, 200° and 350° C. provide approximately 56, 28 and 10 weight percent of silanol in the polysilicate respectively.

Since the polysilicate layer itself is capable of protecting the magnetic-metal thin film medium from corrosion, the intermediate layer or the high adhesive layer functions to improve the adhesion of the polysilicate layer. Consequently, such a function is completely achievable in each of these two layers despite their very small thicknesses which however, because of it, cause substantially no influence on the entire thickness of the whole protective film. In practice, no difference was perceived between the output of a magnetic record member having a protective film with the said two layers and the output obtained without such two layers.

The same may be said with respect to the hydrolysis polymer of a metal alkoxide as well. More specifically, the M—OH group or M—OR group (M=metal) contained in this polymer expedites adhesion to the intermediate layer or the high adhesive layer and forms thereon a layer of excellent antifriction property against the head.

The hydrolysis polymer of a metal alkoxide may be obtained by any conventional process, such as by the hydrolysis polymerization of a compound represented by the following general formula (I):

$$R_mM(OR')_{n-m} \quad (I)$$

wherein M denotes a metal such as Ti, Zr, V, Al, Sn, Zn, Be, Ce, Co, Cr, Cu, Dy, Eu, Fe, Ga, Ge, Hf, In, Mg, Mn, Mo, Nb, Ni, Pd, Rh, Sb, Th, Ta or W; R and R' are alkyl groups, preferably having from 1 to 5 carbon atoms, such as methyl, ethyl, propyl, butyl or amyl; OR' is generally termed as alkoxy radical; n is the valency of M; and m is an integer from 0 to n−1. The preferred metals, M, include Ti, Zr, V, Al, Sn, Zn, Cr, Fe and Ge.

In general, a metal alkoxide is more reactive than an organic metal compound such as a metal chelate and is polymerized through hydrolysis to form a noncrystalline polymer layer of a high hardness on a substrate.

The metal alkoxide used herein is highly reactive to tetraalkoxysilane, tetrahydroxysilane, or tetraacylsilane (silicontetraacylate) all of which are source materials of said polysilicate. A polysilicate layer which involves a hydrolysis polymer of a harder metal alkoxide can be formed by employing a mixture of a metal alkoxide and any one of said various silanes and by baking the entirety. Moreover, although only metal alkoxides have been exemplified above and are commonly used as the source material for preparing the hydrolysis polymer of metal alkoxide, a metal acylate, which may be represented by the following general formula (II):

$$R_mM(OCOR')_{n-m} \quad (II)$$

can also be employed as the starting material for the hydrolysis polymer in the present invention to give the same effect as the metal alkoxide starting material. In this connection, R, R', m, M and n mean the same as defined above for the metal alkoxides.

The inorganic polymer layer may comprise a mixture of one or more of the hydrolysis polymers described above, such as a mixture of a polysilicate and a hydrolysis polymer of a metal alkoxide. In this case, "n−m" in the formulas above is equal to at least 1, whereas if the metal alkoxide is used alone, "n−m" is equal to at least 2.

As mentioned above, the inorganic polymer layer may contain a stress relaxation agent which may be, for example, an organic polymer having at least one group reactive with the inorganic polymer, a metal oxide, a silane coupling agent, a surface coupling agent, or combinations thereof. The amount of stress relaxation agent may be from 0.5 to 10 weight percent, based on the total weight of the inorganic polymer layer.

The metal oxide stress relaxation agent which is added to the inorganic polymer layer may be one of the following materials: Li$_2$O, Na$_2$O, K$_2$O, Rb$_2$O, Cs$_2$O, La₂O₃, As₂O₃, Re₂O₇, BaO, SrO, CrO₃, RuO₄, OsO₄, B₂O₃, Sb₂O₃, Tl₂O₃, or Tl₂O. It may be incorporated into the inorganic polymer layer by dissolving it thoroughly in an alcohol solution containing a metal alkoxide and/or tetrahydroxysilane, and after applying this solution onto the intermediate layer or the high adhesivity layer to coat the same, the entirety is baked.

A mixture of the inorganic polymer and the organic polymer stress relaxation agent having at least one functional group reactive with the inorganic polymer may be formed on the magnetic-metal thin film through the intermediate layer and the high adhesivity layer so as to give further excellent resisting property against frictional contact with the head. This is because the inorganic polymer and the functional grop of the organic polymer are firmly coupled to each other simultaneously with the stress relaxing action of the organic polymer chain. Typical functional groups reactive with the inorganic polymer are as follows: —COOH, —NH₂, —SH, —COOR, —NHR, >NH, —CHO, —NCO, Si—OH, Si—OR, Si—X,

—OCOR and —OH (wherein R denotes an alkyl radical, preferably having from 1 to 5 carbon atoms, and X denotes halogen).

Typical polymers having at least one of the above functional groups are: N-methoxymethyl nylon, a silicone intermediate, epoxy resin, phenol resin, melamine resin, urea resin, celluloses (e.g. acetyl cellulose, nitro cellulose, methyl cellulose, ethyl cellulose, etc.), polyvinyl resins (e.g. polyvinyl acetate, polyvinyl alcohol, polyvinyl formal, polyvinyl butyral, etc.), polyisocyanate, and polymethylmethacrylate.

An organic acid may be added to enhance the reactivity between the inorganic polymer and the functional group of any of the above organic polymers. The amount of the acid to be added may be from 0.3 to 0.5 weight percent, based on the total weight of the composition employed to prepare the inorganic polymer layer (e.g., solution (II) in Example 1). Typical acids include oxalic, lactic, glycolic, succinic, itaconic, maleic, lauric, hypophosphorous and crotonic acids. In addition, and particularly for the epoxy resin stress relaxation agent, any of the following may be added as a hardening agent in conventional amounts: diethylene triamine, diethylaminopropylamine, polyamide resin, amines such as a silane coupling agent containing an amino group, acid anhydrides such as phthalic anhydride, tetrahydrophthalic anhydride or dodecylsuccinic anhydride, and isocyanates such as hexamethylene diisocyanate, trilene diisocyanate or polyisocyanate.

The above-mentioned silicone intermediate is a silicone polymer whose average molecular weight ranges from 500 to 2,000. It has functional groups such as SiOH and/or SiOCH₃ in amounts of 5.5 and 15 weight percent, respectively, based on the weight of the silicone polymer, and is capable of bonding firmly to the inorganic polymer.

The silane coupling agent which may be used as a stress relaxation agent is a silane compound represented by the following general formula (III):

(III)

wherein: n is an integer of from B 0 to 3; Xa and Xb are atoms of halogen such as chlorine or bromine, or ORd, OCORd or OORd (in which Rd denotes an alkyl radical, preferably having from 1 to 5 carbon atoms, such as —CH₃, —C₂H₅, —CH₂CH₂OCH₃, or and Rc denotes a portion composed of an organic compound having a functional group such as

HSCH₂CH₂CH₂—,
H₂NCH₂CH₂CH₂—,
H₂NCH₂CH₂NH(CH₂)₃—,
H₂C=CH—,

H₃COOCCH₂CH₂NH— or
(CH₂)₂NH(CH₂)₃—.

Xa and Xb produce a silanol group Si-OH through hydrolysis.

Some specific examples of such silane coupling agents are as follows:

vinyltrichlorosilane —CH₂=CHSiCl₃
vinyltriethoxysilane —CH₂=CHSi(OC₂H₅)₃
vinyl-tris (beta-methoxy ethoxy) silane —CH₂=CHSi(OCH₂CH₂OCH₃)
gamma-methacryloxypropyl trimethoxysilane — beta (3,4-epoxycyclohexyl) ethyltrimethoxysilane gamma-glycidoxypropyltrimethoxysilane
CH₂—CHCH₂O(CH₂)₃Si(OCH₃)₃
　＼／
　　O
vinyltriacetoxysilane
　CH₂=CHSi(OOCCH₃)₃
gamma-chloropropyltrimethoxysilane
　ClCH₂CH₂CH₂Si(OCH₃)₃
gamma-mercaptopropyltrimethoxysilane
　HSCH₂CH₂CH₂Si(OCH₃)₃
gamma-aminopropyl triethoxysilane
　NH₂CH₂CH₂CH₂Si(OC₂H₅)₃
N-beta (aminoethyl)-gamma aminopropyl trimethoxysilane
　NH₂CH₂CH₂NH(CH₂)₃Si(OCH₃)₃
vinyl-tris (t-butylperoxy) silane In addition to the above materials, a polyaminosilane may be used as a stress relaxation agent. The polyaminosilane has a structure similar to formula (III) above, but wherein Rc includes both the repeating unit and an organic radical having primary, secondary and tertiary amino groups branched in a complicated manner to form a matrix represented by the following formula (IV):

wherein the intersecting solid lines represent a carbon atom.

The surface coupling agent described below may also be used as a stress relaxation agent.

The stress relaxation agent exhibits reactivity with the intermediate layer or the high adhesivity layer in addition to its property of relaxation of stress, so as to intensify the adhesive force exerted thereto.

The silane coupling agent may also be used for the aforementioned high adhesivity layer. In addition to the silance coupling agent, it is also possible to employ, as the high adhesivity layer, a chrome complex of which a typical one is methacrylatochromic chloride.

The chrome complex has a structure represented by the following general formula (V) and is capable of firmly coupling the intermediate layer to the inorganic polymer layer containing (or not containing) the stress relaxation agent:

Wherein $R_1$ denotes an alkyl hydrocarbon group, preferably having from 1 to 30 carbon atoms, such as $H_3C-$, $H_5C_2-$, $H_7C_3-H_9C_4-$ or $H_{37}C_{18}-$; and the arrow denotes a coordination bond. The preferred $R_1$ is The lubricants which may be used in the lubricant laver 8 of the present invention include, for example, silicone oil, fluoro oil (for example, fluorinated polyethers or telomers of tetrafluoroethylene or trifluorochloro ethylene), fluorosilicone oil, polyglycol, phosphate, perfluoro alkyl polyether, higher fatty acids and their esters.

The preferred lubricant is a so-called "oriented" lubricant (as defined in the aforesaid U.S. Pat. No. 4,069,360) and is composed of, as described in Japanese Patent Application Disclosure No. 55603/1977, an oil such as oriented silicone oil, fluoro oil or fluoro silicone oil; or a silane or silazane such as octadecyltrichlorosilane, hexamethyldisilazane, N,N-dimethyl-N-octadecyl-3-aminopropyl trimethoxysilyl chloride (DMOAP) or dimethyldichlorosilane (these and like silanes and silazanes will be hereinafter referred to as 1 surface coupling agents). It should be noted that the surface coupling agent also functions as a stress relaxation agent. These silanes may be represented by the following general formula (VI):

$$(R_2)_n SiX_{4-n} \qquad (VI)$$

where: $R_2$ is an alkyl group, preferably having from 1 to 30 carbon atoms, or an aromatic hydrocarbon, such as $-CH_3$, $-C_2H_5$, $-C_3H_7$, $-C_4H_9$, $-C_{18}H_{37}$, $-C_6H_5$, or a fluorocarbon such as $-CF_3$, $-C_2F_5$, $-C_3F_7$, $-C_{18}F_{37}$; X is an alkoxy group such as $-OCH_3$, $-OC_2H_5$, $-OC_3H_7$, or a halogen such as chlorine or bromine, or an alkylperoxy group such as $-OOC_4H_9$; and n is an integer of 1, 2 or 3.

The intermediate layer employed in the present invention comprises a metal oxide, a hydrated metal oxide, a mixture thereof or a metallic salt. This layer may be obtained by subjecting its metallic underlayer (i.e., the magnetic-metal thin film medium or the nonmagnetic metal layer formed thereon) to a chemical treatment, electrochemical treatment or heat treatment.

More concretely, the intermediate layer may be formed by chemical treatment, such as by immersing the metallic underlayer into an acid or alkali solution, which may contain a metallic salt, an oxidizer, a buffer agent or a mixture thereof. For example, the metallic underlayer may be immersed in a solution of the type shown in Example 1, Solution (I), for a period of time of from 10 seconds to 3 minutes. The metallic salts which may be used include primary, secondary and tertiary phosphates of manganese, chromium, zinc and alkali metals. The oxidizers which may be used include chromic acid, dichromates, permanganates, perchlorates, nitrites, hydrogen peroxide, and benzoyl peroxide.

The buffer agents which may be used include carboxylic acids and their salts. The acids which may be used include nitric acid, sulfuric acid, hydrofluoric acid, phosphoric acid, acetic acid, fluoro acetic acid and oxalic acid. Examples of the alkalis which may be used include potassium hydroxide, sodium carbonate, ammonia, and sodium carbonate.

The intermediate layer may also be formed by electrochemical treatment, such as by immersing the metallic underlayer in the aforesaid acid or alkali solution and applying electric current to the metallic underlayer as an electrode. For example, the metallic underlayer may be immersed in the same solution used in Example 1, i.e., Solution (I), as an electrode and a current of 50 amperes/square decimeter is used to form the intermediate layer.

Similarly, a heat treatment may be utilized to form the intermediate layer. For example, the metallic underlayer may simply be heated at a temperature of from 100° to 350° C. for a period of time necessary to form the desired thickness.

As is apparent from the above discussion, the intermediate layer may therefore comprise (1) an oxide or hydrated oxide of a metal forming the underlayer, (2) mixtures thereof, (3) mixtures thereof with an oxide of another metal (e.g., chromium), (4) an oxide of another metal (e.g., chromium), (5) a salt (e.g., a phosphate) of a metal forming the underlayer or (6) a salt (e.g., a phosphate) of another metal (e.g., chromium). The particular metallic salts or oxidizers employed in the aforementioned acid or alkali solution determine the specific salts or oxides of the other metals.

The thicknesses of the various layers comprising the magnetic record member of the invention may be determined based on the foregoing description. Specifically, the thicknesses of the layers may be within the following dimensions:

| layer | thickness (microns) |
| --- | --- |
| alloy layer 2 | 10–100 |
| magnetic-metal thin film medium 3 | 0.01–0.10 |
| nonmagnetic metal layer 4 | 0.01–0.10 |
| intermediate layer 5 | 0.005–0.05 |
| high adhesivity layer 6 | 0.001–0.01 |
| inorganic polymer layer 7 | 0.02–0.2 |
| lubricant layer 8 | 0.001–0.01 |

The magnetic record member of the present invention and suitable methods for making the same will now be described in more detail with reference to the following examples.

EXAMPLE 1

A disk-shaped aluminum alloy base was finished to a surface having a slight topograph (less than 50 microns in the circumferential direction and less than 100 microns in the radial direction) by turning and heat-flattening processes to provide an alloy disk 1. The aluminum alloy base was plated with a nonmagnetic alloy of nickel-phosphorus (Ni-P) to a thickness of about 50 microns to form a nonmagnetic metal layer 2 thereon. The nickel-phosphorus layer was then mirror-finished by mechanical polishing to obtain a surface roughness of 0.04 micron or less and a thickness of about 30 microns. The nonmagnetic alloy layer 2 was then plated with a magnetic metal alloy of cobalt-nickel-phosphorus (Co-Ni-P) to a thickness of about 0.05 micron to form a magnetic-metal thin film medium 3 thereon. Subsequently, the disk thus plated with the magnetic Co-Ni-P alloy was immersed in a solution (I) of the following composition for two minutes, and after rinsing and drying, an intermediate layer of cobalt oxide and chromium oxide was formed thereon by such chemical treatment:

| Solution (I) | |
| --- | --- |
| chromic acid anhydride | 0.5% by weight |
| sodium hydrosulfonic acid | 2.0% by weight |
| 1% dilute sulfuric acid | balance |

The chemical treatment layer thus formed was coated with a solution (II) of the following composition by a spin coating process described below:

| Solution (II) | |
| --- | --- |
| 11% ethyl alcohol solution of tetrahydroxysilane: | 10% by weight |

| Solution (II) | |
| --- | --- |
| n-butyl alcohol: | 90% by weight |

The disk consisting of the aluminum alloy base and sequential coatings of the nickel-phosphorus layer, the cobalt-nickel-phosphorus layer and the chemical treatment layer was rotated within a horizontal plane at a speed higher than 200 revolutions per minute. In this state, the solution (II) was supplied from its vessel onto the surface of the disk. Then the solution was spread outward on the disk surface by centrifugal force while wetting the same. With evaporation of the solvents (ethyl alcohol and n-butyl alcohol) contained in the solution thus spread on the disk surface, a layer of polysilicate was formed thereon. The disk thus coated with the polysilicate layer containing a hydrolysis polymer of metal alkoxide and having a thickness of 0.1 micron was left awhile at room temperature (about 25° C.) to further evaporate the solvents of ethyl alcohol and n-butyl alcohol remaining in the polysilicate layer, and after drying, the entirety was baked at 200° C. for one hour, thereby forming a protective film on the disk to produce a magnetic record member.

EXAMPLE 2

In a manner similar to Example 1, with the exception that solutions of the following compositions were used instead of the foregoing solutions (I) and (II), a polysilicate layer containing a stress relaxation agent and a hydrolysis polymer of metal alkoxide was formed on a magnetic-metal thin film medium through a chemical treatment layer, thereby forming a protective film on the disk to produce a magnetic record member.

| Solution (I) | |
| --- | --- |
| Manganese primary phosphate | 2% by weight |
| potassium permanganate | 0.1% by weight |
| 1% phosphoric acid | balance |
| Solution (II) | |
| tetrahydroxysilane 11% ethyl alcohol solution | 9% by weight |
| gallium n-butylate | 1% by weight |
| epoxy resin available from Shell Chemical Company under the tradename EPICOAT 828 | 0.05% by weight |
| polyamino silane available from TORAY Silicone Company under the tradename SH6050 | 0.05% by weight |
| isobutyl acetate | 50% by weight |
| n-butyl alcohol | balance |

EXAMPLE 3

In a manner similar to Example 1, a chemical treatment layer was coated by a spin coating process with an n-butyl alcohol solution which contained 0.1% by weight of a silane coupling agent, gamma-glycidoxypropyltrimethoxysilane, serving as a high adhesitity agent. Subsequently, as in Example 1, the high adhesive agent was further coated with a polysilicate and then the entirety was baked at 200° C. for two hours, thereby forming a protective film on the disk to produce a magnetic record member.

EXAMPLE 4

In a manner similar to Example 3, a chemical treatment layer was coated, through a high adhesivity agent, with an inorganic polymer containing a stress relaxation agent by the use of a solution (II) of the following composition instead of the corresponding one in Example 3:

by such frictional contact with the head was determined. The results of such experiments for the magnetic record members of Examples 1 through 6 and the respective numbers of CSS cycles are shown in the Table given below.

| Example | Nonmagnetic Metal | High Adhesivity Layer | Solution (II) | Lubricant | CSS Cycles |
|---|---|---|---|---|---|
| 1 | — | — | polysilicate | — | 10000 |
| 2 | — | — | polysilicate + stress relaxation agent + metal alkoxide | — | 25000 |
| 3 | — | silane coupling agent | polysilicate | — | 30000 |
| 4 | — | silane coupling agent | polysilicate + stress relaxation agent + metal alkoxide | oriented | 55000 |
| 5 | NiP | silane coupling agent | polysilicate | — | 35000 |
| 6 | NiP | silane coupling agent | polysilicate + stress relaxation agent + metal alkoxide | oriented | 60000 |

| Solution (II) | |
|---|---|
| tetrahydroxysilane 11% ethyl alcohol solution | 9% by weight |
| zirconium propylate | 1% by weight |
| hexamethyldisilazane | 0.1% by weight |
| n-butyl alcohol | balance |

Then a 0.1% trichlor ethylene solution of perfluoro octadecyl trichlorosilane was applied as an oriented lubricant on the inorganic polymer layer, and the entirety was baked at 200° C. for two hours, thereby forming a protective film on the disk to produce a magnetic record member.

EXAMPLE 5

In a manner similar to Example 3, a magnetic-metal thin film medium was plated with a nonmagnetic metal of nickel-phosphorus (Ni-P) to a thickness of 0.05 micron, and then was further coated with a chemical treatment layer, a high adhesivity agent and a polysilicate layer in sequence to produce a magnetic record member.

EXAMPLE 6

In a manner similar to Example 4, a magnetic-metal thin film medium was sequentially coated, through a nonmagnetic alloy of nickel-phosphorus, with a chemical treatment layer, a high adhesivity layer, an inorganic polymer and an oriented lubricant to produce a magnetic record member.

COMPARATIVE EXAMPLE

A magnetic record member was produced in a manner similar to Example 1 with the exception that a polysilicate layer was formed on a magnetic-metal thin film medium without forming a chemical treatment layer, and the entirety was baked at 200° C. for two hours to form a protective film on the disk.

Using the magnetic record members obtained in Examples 1 through 6 and the Comparative Example and also a head with a tapered front liable to collect dust, recording and playback operations were performed repeatedly by the contact-start-stop (CSS) system in which the magnetic record member and the head were kept in contact with each other at the start and termination of each operation. The change (peeling) caused in the surface condition of each magnetic record member According to the experimental results, the magnetic record member obtained in the Comparative Example indicated several to ten percent peeling in the total friction traces caused by the head during 7,000 CSS cycles (although no scar was perceived on the magnetic-metal thin film medium), while none of the magnetic record members obtained in Examples 1 through 6 indicated any peeling at all even after the respective number of CSS cycles given in the above Table.

It is evident fron the above that improved antiabrasion characteristics against contact with the head are achieved in the magnetic record member of Example 1 having an inorganic polymer layer on a magnetic-metal thin film medium through a chemical treatment layer. The table also shows that more improved antiabrasion characteristics to the head are achieved in the magnetic record member of Example 2 with the inorganic polymer layer containing a stress relaxation agent. In the record member of Example 3 having an inorganic polymer layer on a chemical tretment layer through a high adhesivity agent, further improved antiabrasion characteristics to the head are achieved. These characteristics are more enhanced in the record member of Example 4 where a stress relaxation agent is contained in the inorganic polymer layer and an oriented lubricant layer is formed thereon. It is to be noted that, as compared with the magnetic record members of Examples 3 and 4 where a nonmagnetic alloy layer is not present, the antiabrasion characteristics to the head are further enhanced somewhat in the record member of Example 5 where an inorganic polymer layer is formed on a magnetic-metal thin film medium through a nonmagnetic alloy layer and a high adhesivity agent, and also in the record member of Example 6 where a stress relaxation agent is contained in the inorganic polymer layer and an oriented lubricant layer is formed thereon.

With respect to the output variation occurring in the stable flying state of the head due to nonuniformity in the thickness of the protective film over the magnetic-metal thin film medium, the ratio of the minimum output to the maximum output on the same track was 70 percent in Examples 1 through 4, and this rate was increased to 80 percent in Examples 5 and 6, indicating that a wide improvement was attained in the error margin.

As regards the resistance of these magnetic record members against environmental conditions, tests were conducted ten times repeatedly, each consisting of two 4-hour cycles at a temperature of 65° C. and a relative humidity of 90% and one 3-hour cycle at a temperature of −40° C. The test results revealed no deterioration in the recording and playback characteristics and the anti-abrasion characteristics to the head.

Although a metal was used for the nonmagnetic disk base in the examples of this invention, the specific material used is not critical and it may be replaced with other materials such as plastics, glass or ceramics. Moreover, instead of baking the whole magnetic record member at 200° C. as in the examples, the object of the invention can also be accomplished by removing the solvent through complete drying at an ordinary temperature (about 25° C.) or by using a different solvent of a high vapor pressure. It is further possible to execute baking at temperatures above 200° C. within a limit not impairing the magnetic characteristics of the record member. In addition, nonmagnetic alloys and magnetic-metals other than those exemplified above can be employed, as is apparent to those skilled in the art. Further, as pointed out above, more than one layer of the inorganic polymer may be applied by repeating the procedure described above for the single thickness.

What is claimed is:

1. A magnetic record member comprising:
a nonmagnetic disk base polished to have a mirror surface;
a magnetic-metal thin film medium formed on the mirror surface of said disk base;
an intermediate layer formed on said film medium, said intermediate layer being of a material chosen from the group consisting of an oxide of a magnetic-metal, a chromium oxide, a phosphate, and mixtures thereof; and
at least one layer of an inorganic polymer formed on said intermediate layer, said inorganic polymer being of a material chosen from the group consisting of a polysilicate, a hydrolysis polymer of a metal alkoxide and mixtures thereof.

2. The magnetic record member as claimed in claim 1, further comprising a nonmagnetic metal layer formed between said magnetic-metal thin film medium and said intermediate layer.

3. The magnetic record member as claimed in claim 2, further comprising a high adhesivity layer formed between said intermediate layer and said inorganic polymer layer.

4. The magnetic record member as claimed in claim 1, 2 or 3, wherein said intermediate layer comprises a chromium phosphate.

5. The magnetic record member as claimed in claim 1, 2, or 3, wherein said metal alkoxide is at least one alkoxide of a metal selected from the group consisting of Al, Be, Ce, Co, Cr, Cu, Dy, Eu, Fe, Ga, Ge, Hf, In, Mg, Mn, Mo, Nb, Ni, Pd, Rh, Sb, Sn, Th, Ti, Ta, V, W, Zr and Zn.

6. The magnetic record member as claimed in claim 1, 2, or 3, wherein said polysilicate is a polymer of tetrahydroxysilane.

7. The magnetic record member as claimed in claim 1, 2 or 3, wherein said inorganic polymer layer contains a stress relaxation agent.

8. The magnetic record member as claimed in claim 7, wherein said stress relaxation agent comprises at least one organic polymer having a functional group reactive with said inorganic polymer.

9. The magnetic record member as claimed in claim 8, wherein said organic polymer comprises a polymer having at least one functional group selected from the group consisting of and —OH, wherein R represents an alkyl group and X represents halogen.

10. The magnetic record member as claimed in claim 9, wherein said organic polymer is N-methoxymethyl nylon, a silicone intermediate, an epoxy resin, a phenol resin, a melamine resin, a urea resin, cellulose, a polyvinyl resin, a polyisocyanate, or polymethylmethacrylate.

11. The magnetic record member as claimed in claim 7, wherein said stress relaxation agent comprises at least one metal oxide.

12. The magnetic record member as claimed in claim 11, wherein said metal oxide is BaO, SrO, $Li_2O$, $Na_2O$, $K_2O$, $Rb_2O$, $Cs_2O$, $La_2O_3$, $As_2O_3$, $OsO_4$, $B_2O_3$, $Sb_2O_3$, $Re_2O_7$, $CrO_3$, $RuO_4$, $Tl_2O$ or $Tl_2O_3$.

13. The magnetic record member as claimed in claim 7, wherein said stress relaxation agent comprises a silane coupling agent.

14. The magnetic record member as claimed in claim 13, wherein said silane coupling agent comprises a polyaminosilane.

15. The magnetic record member as claimed in claim 7, wherein said stress relaxation agent comprises a surface coupling agent.

16. The magnetic record member as claimed in claim 7, wherein said stress relaxation agent comprises at least two members selected from the group consisting of an organic polymer having a functional group reactive with said inorganic polymer, a metal oxide, a silane coupling agent and a surface coupling agent.

17. The magnetic record member as claimed in claim 16, wherein said organic polymer comprises a polymer having at least one functional group selected from the group consisting of and —OH, wherein R represents an alkyl group and X represents a halogen.

18. The magnetic record member as claimed in claim 17, wherein said organic polymer is N-methoxymethyl nylon, a silicone intermediate, an epoxy resin, a phenol resin, a melamine resin, a urea resin, cellulose, a polyvinyl resin, a polyisocyanate, or polymethylmethacrylate.

19. The magnetic record member as claimed in claim 16, wherein said metal oxide is BaO, SrO, $Li_2O$, $Na_2O$, $K_2O$, $Rb_2O$, $Cs_2O$, $La_2O_3$, $As_2O_3$, $OsO_4$, $B_2O_3$, $Sb_2O_3$, $Re_2O_7$, $CrO_3$, $RuO_4$, $Tl_2O$, or $Tl_2O_3$.

20. The magnetic record member as claimed in claim 16, wherein said silane coupling agent comprises a polyaminasilane.

21. The magnetic record member as claimed in claim 1, 2 or 3, further comprising a lubricant layer formed on the inorganic polymer layer.

22. The magnetic record member as claimed in claim 21, wherein said lubricant is an oriented lubricant.

23. The magnetic record member as claimed in claim 22, wherein said oriented lubricant comprises a member selected from the group consisting of fluorinated alkoxysilane, alkoxysilane, chlorosilane, silazanes and combinations thereof.

24. The magnetic record member as claimed in claim 22, wherein said oriented lubricant comprises at least one member selected from the group consisting of dimethyl silicone oil, methylphenyl silicone oil, fluoro silicone oil and fluoro oil.

25. The magnetic record member as claimed in claim 1, 2 or 3, wherein said inorganic polymer layer comprises a polysilicate, and further comprising a fluorinated alkoxysilane layer formed as a lubricant on the polysilicate.

26. The magnetic record member as claimed in claim 1, further comprising a high adhesivity layer formed between said intermediate layer and said inorganic polymer layer.

27. The magnetic record member as claimed in claim 3 or 26, wherein said high adhesivity layer comprises a silane coupling agent.

28. The magnetic record member as claimed in claim 3 or 26, wherein said high adhesivity layer comprises methacrylato chromic chloride.

* * * * *

UNITED STATES PATENT AND TRADEMARK OFFICE
CERTIFICATE OF CORRECTION

PATENT NO. : 4,307,156
DATED : December 22, 1981
INVENTOR(S) : Masahiro Yanagisawa It is certified that error appears in the above—identified patent and that said Letters Patent is hereby corrected as shown below:

Column 7, line 15, "grop" to read -- group --;

Column 8, line 1, delete "B".

Signed and Sealed this

Sixth Day of April 1982

|SEAL|

Attest:

GERALD J. MOSSINGHOFF

Attesting Officer     Commissioner of Patents and Trademarks